(12) United States Patent
Kölhi et al.

(10) Patent No.: US 9,531,621 B2
(45) Date of Patent: Dec. 27, 2016

(54) METHOD FOR SCALABLE MEASURING OF CONNECTIVITY BETWEEN TWO WAY ACTIVE MEASUREMENT PROTOCOL (TWAMP) ENTITIES

(75) Inventors: Johan Kölhi, Vaxholm (SE); Lars Hallström, Vaxholm (SE); Tomas Thyni, Järfälla (SE); Annikki Welin, Solna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 122 days.

(21) Appl. No.: 14/389,027

(22) PCT Filed: Apr. 4, 2012

(86) PCT No.: PCT/SE2012/050369
§ 371 (c)(1),
(2), (4) Date: Sep. 29, 2014

(87) PCT Pub. No.: WO2013/151471
PCT Pub. Date: Oct. 10, 2013

(65) Prior Publication Data
US 2015/0058479 A1    Feb. 26, 2015

(51) Int. Cl.
*G06F 11/00* (2006.01)
*G06F 15/173* (2006.01)
(Continued)

(52) U.S. Cl.
CPC .............. *H04L 43/50* (2013.01); *H04L 41/00* (2013.01); *H04L 43/00* (2013.01); *H04L 43/08* (2013.01);
(Continued)

(58) Field of Classification Search
CPC .......... H04L 43/50; H04L 41/00; H04L 43/00; H04L 43/10
(Continued)

(56) References Cited

U.S. PATENT DOCUMENTS 6,314,465 B1 * 11/2001 Paul .................... H04L 67/1008
709/217
2002/0067724 A1 * 6/2002 Helm .................. H04L 12/1863
370/390
(Continued)

OTHER PUBLICATIONS

J. Dongxing, "A Source-Specific Multicast Routing Protocol for Mobile Ad Hoc Networks," 2006 International Conference on Wireless Communications, Networking and Mobile Computing, Wuhan, 2006, pp. 1-4.*
(Continued)

*Primary Examiner* — Taylor Elfervig
(74) *Attorney, Agent, or Firm* — Patents on Demand, P.A.; Brian K. Buchheit; Scott M. Garrett

(57) ABSTRACT

The present invention relates to method and arrangements to measure connectivity between Two Way Active Measurement Protocol TWAMP entities comprising a session-server (15) and session-reflectors (16-23) in a communication network. The method comprises steps like: Dividing in the session-server (15), the session-reflectors (16-23) into at least one defined group (11-14) of session-reflectors (16-17, 18-9,20-21,22-23); Transmitting a test session (1;1-4) from the session-server (15) to the session-reflectors (16-7;16-23) by using Source Specific Multicasting, said test session comprising at least one test packet (1a-1c;1a-4c) 1 being destined to at least one session-reflector (16-17;16-23) in at least one defined group (11;11-14); Replying to the at least one test packet (1a-1c;1a-4c) by the at least one session-reflector (16-17;16-23).

12 Claims, 6 Drawing Sheets

(51) Int. Cl.
*G06F 15/16* (2006.01)
*H04L 12/26* (2006.01)
*H04L 12/725* (2013.01)
*H04L 29/06* (2006.01)
*H04L 12/24* (2006.01)

(52) U.S. Cl.
CPC ....... *H04L 43/0811* (2013.01); *H04L 43/0858* (2013.01); *H04L 43/0864* (2013.01); *H04L 43/10* (2013.01); *H04L 43/106* (2013.01); *H04L 45/30* (2013.01); *H04L 69/14* (2013.01)

(58) Field of Classification Search
USPC .................................. 370/252; 790/224, 250
See application file for complete search history.

(56) References Cited

U.S. PATENT DOCUMENTS

| | | | | |
|---|---|---|---|---|
| 2004/0024915 | A1* | 2/2004 | Abe | H04L 29/06 709/250 |
| 2009/0080340 | A1* | 3/2009 | Duffield | H04L 43/10 370/252 |
| 2010/0182991 | A1* | 7/2010 | Abraham | H04J 3/0673 370/349 |
| 2010/0246415 | A1 | 9/2010 | Nishi et al. | |

OTHER PUBLICATIONS

Jun-Hong Cui, D. Maggiorini, Jinkyu Kim, K. Boussetta and M. Gerla, "A protocol to improve the state scalability of source specific multicast," Global Telecommunications Conference, 2002. GLOBECOM '02. IEEE, 2002, pp. 1899-1904 vol. 2.*

S. Lin, "Differentiated QoS multicast based on the Source Specific Multicast (SSM) model," Intelligent Data Acquisition and Advanced Computing Systems: Technology and Applications, 2009. IDAACS 2009. IEEE International Workshop on, Rende, 2009, pp. 705-708.*

Bhattacharyya, S., "An Overview of Source-Specific Multicast (SSM)", Network Working Group Request for Comments: 3569, Jul. 1, 2003, pp. 1-14,The Internet Society.

Hedayat, K., et al., "A Two-Way Active Measurement Protocol (TWAMP)", Network Working Group Request for Comments: 5357, Oct. 1, 2008, pp. 1-26, The Internet Engineering Task Force.

Holbrook, H., et al., "Source-Specific Multicast for IP", Network Working Group Request for Comments: 4607, Aug. 1, 2006, pp. 1-19, The Internet Society.

* cited by examiner

METHOD FOR SCALABLE MEASURING OF CONNECTIVITY BETWEEN TWO WAY ACTIVE MEASUREMENT PROTOCOL (TWAMP) ENTITIES

TECHNICAL FIELD

The present invention relates to methods and arrangements and more particularly, to mechanisms and techniques to measure connectivity between TWAMP entities comprising session-servers and session-reflectors in a communication network.

BACKGROUND

A Two Way Active Measurement Protocol TWAMP is a protocol for measuring two-way or round trip metrics between network devices. In the TWAMP architecture a session-receiver is called a session-reflector and a session-sender is called a session-server. The session-reflector has the capability to time stamp and return a measurement packet when it receives the measurement packet from the session-server. Unlike the session-server, the session-reflector does not collect any packet information. It just time stamp the packet and send it immediate back to the server. The server is an end system that manages one or more TWAMP sessions, and is capable of configuring per-session state in the endpoints. The session-server and the session-reflector exchange test packets according to the TWAMP-test protocol for each active session. In TWAMP, unicast messaging is used to exchange test packets between two TWAMP entities [see "A Two-Way Active Measurement Protocol (TWAMP); RFC 5357]. To be able to verify connection between for example small base stations and a Radio Network Controller, a unicast-based test session server open and provide a test session for each unique user.

FIG. 1 belongs to the prior art and discloses measurement of connectivity between a Radio Network controller RNC 15 (session-server) and small base stations, so called Pico BTSs 16-23 (session-reflectors). The server and the reflectors are connected via routers 25 in a tree structure. The connectivity measuring in FIG. 1 is performed by the Two Way Active Measurement Protocol TWAMP by using unicast. The session-server 15 in the figure manages eight TWAMP test sessions. The session-server and each session-reflector exchange test packets according to the TWAMP measurement architecture for each active session. A unicast message is a message directed to a specific device on a network (just one specific device). Unicast routing is the process of forwarding unicasted traffic from a source to a destination by using routing protocols such as e.g. Routing Information Protocol (RIP). In FIG. 1 can be seen how a first test session 1 comprising three test packets 1*a*,1*b*,1*c* is forwarded from the session-server 15 via the routers 25, to a first session-reflector 16, how a second test session 2 comprising three test packets 2*a*-2*c* is transmitted from the session-server 15 to a second session-reflector 16, and so on until all the reflectors 16-23 have received their packets. When a reflector has received a test packet it time stamp's the packet and send it back to the session-server 15. If the number of session-reflectors increases this will result in problems with increasing bandwidth consumption since each of them will have a TWAMP session. A lot of extra measurement traffic is then sent via narrow lines taken bandwidth from the data traffic. A second problem with the TWAMP test according to prior art is that the session-server 15 in uplink simultaneously has to handle many replies from the reflectors at the same time. This consumes processing power from the server's other duties.

SUMMARY

An aim of the embodiments is to overcome above identified limitations of the prior art. The embodiments focus on solving the scalability issues with many sessions by dividing session-reflectors into at least one defined group of session-reflectors and by creating a Source Specific Multicast tree wherein packets are transmitted from a session-server to session reflectors in at least one defined group by using Source Specific Multicasting. To avoid congestion at the sender side when reflectors simultaneously answer back, timely separated replies are introduced.

The solution in one exemplified embodiment is a method to measure connectivity between Two Way Active Measurement Protocol TWAMP entities comprising a session-server and session-reflectors in a communication network. The method comprises the following steps:

The session-reflectors are divided in the session-server into at least one defined group of session-reflectors.

A test session is transmitted from the session-server to the session-reflectors by using Source Specific Multicasting. The test session comprises at least one test packet destined to at least one session-reflector in at least one defined group.

The at least one session-reflector replies to the at least one test packet.

The solution in another exemplified embodiment is a session-server node of a communication network. The node is configured to transmit a Two Way Active Measurement Protocol TWAMP test session to session-reflectors. The node comprises means to divide the session-reflectors into at least one defined group of session-reflectors and means to transmit a test session to the session-reflectors by using Source Specific Multicasting. The node further comprises means to receive test packets from the session-reflectors.

The solution in yet another exemplified embodiment is a session-reflector node of a communication network configured to reflect test packets in a Two Way Active Measurement Protocol TWAMP test session. The node comprises means to receive the test packets from a session-server and means to time stamp the received test packets. The node further comprises means to buffer the received test packets and means to send time stamped packets to the session-server.

The solution in yet another exemplified embodiment is a computer program product comprising computer program code, wherein the computer program comprises code adapted to perform the above mentioned method when the computer program code is executed in a processor.

Objects of the invention are to solve the scalability issues with many sessions when exchanging test packets using Two Way Active Measurement Protocol. This object and others are achieved by methods, node arrangements and computer program products.

The invention has advantages such as efficiently using bandwidth in measurement infrastructure when using Two Way Active Measurement Protocol TWAMP test sessions.

The invention will now be described more in detail with the aid of preferred embodiments in connection with the enclosed drawings.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 1:
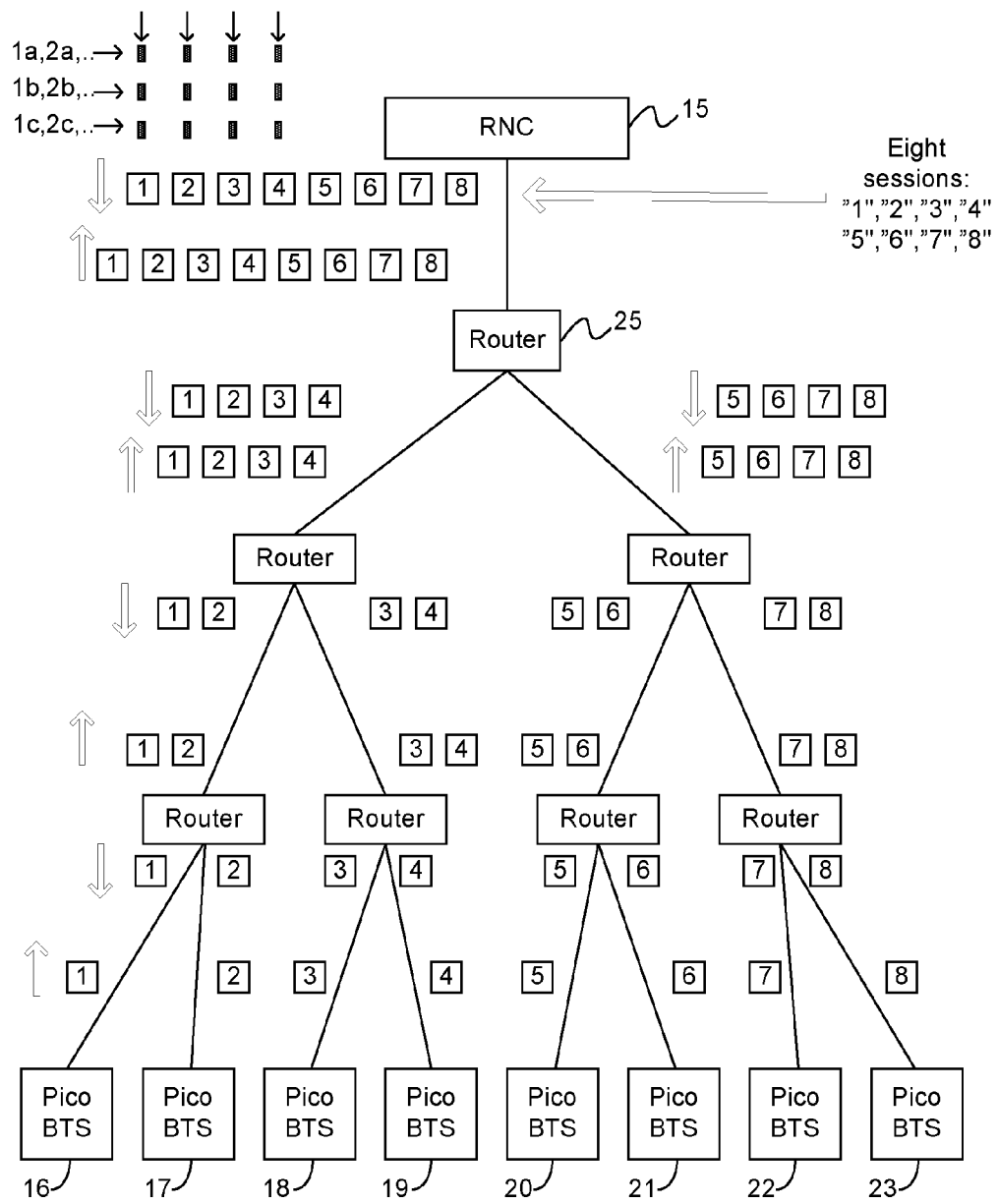
FIG. 1 belongs to the prior art and discloses measurement of connectivity between a Radio Network controller RNC (session-server) and base stations (session-reflectors). The measuring in FIG. 1 is performed by Two Way Active Measurement Protocol TWAMP by using unicast.
Figure 2:
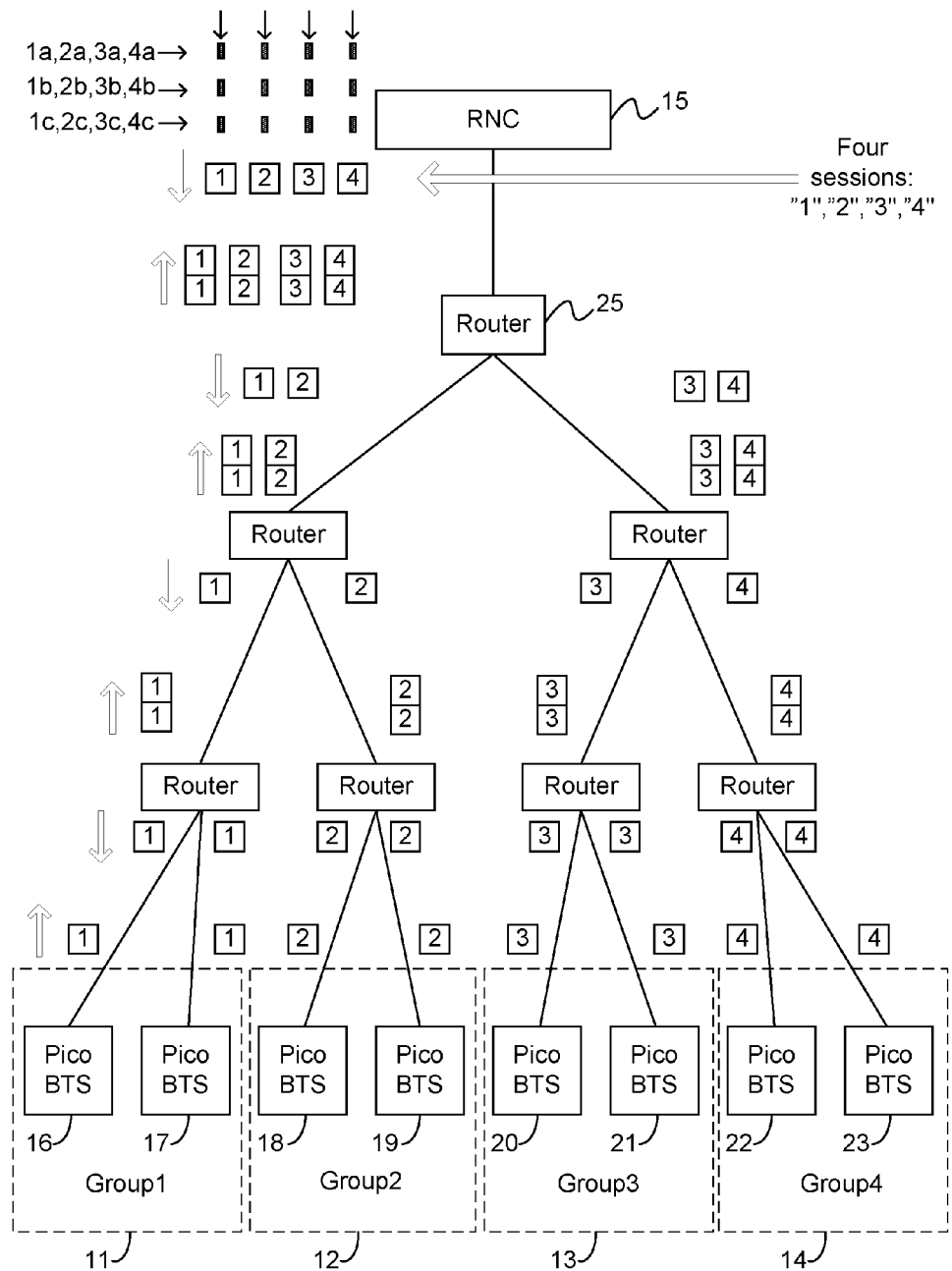
FIG. 2 discloses measurement of connectivity between a Radio Network controller RNC (session-server) and base stations (session-reflectors). The measuring is performed with Two Way Active Measurement Protocol TWAMP by using Source Specific Multicast, in this example with four test sessions.

FIG. 2 discloses in a first exemplified embodiment measurement of connectivity between a Radio Network controller RNC 15 (session-server) and Pico BTSs 16-23 (session-reflectors) connected via routers 25 in a tree structure. To be noted is that the RNC is an example and in for example a Long Term Evolution LTE network a Packet Data Network PDN Serving Gateway SGW instead is used. The session-server, the session receivers and the routers have been mention earlier in FIG. 1. A prerequisite for a method according to this first embodiment is that a service—a Two Way Active Measurement Protocol TWAMP service has been announced to potentially requesting receivers. The service is represented by a source multicast IP address S (not shown in figure) identifying the session-server 15. In this example the service has been announced to all the session-reflectors 16-23 disclosed in FIG. 2 and all the session-reflectors have replied, i.e. they have sent an IGMP multicast join request [see RFC 3569], or Multicast Listener Discovery MLD FOR ipV6 multicast join to the service by returning their respectively IP-address G (not in figure). Instead of measuring by using unicast as disclosed in the BACKGROUND part, in this embodiment the reflectors will be divided into groups and Source Specific Multicast [see "Source-Specific Multicast for IP; RFC 4607] will be used for transport measurement messages. The method comprises the following steps:

At reception of the reflector IP-addresses G to the session-server 15, the reflectors 16-23 are divided in the session-server into defined groups 11-14. The dividing into the groups can be performed for example by using hashing techniques for example by using the last bits in the reflector's IP address to create an automatic division into groups. To be noted is that other techniques apart from hashing can be used, for example pre-configuring the reflectors or redirect the reflectors to a configuration server. In FIG. 2 can be seen how the reflectors 16-23 in this example have been divided into four different groups 11-14, whereby reflectors 16-17 compose Group1 11, 18-19 compose Group2 12, 20-21 compose Group3 13 and 22-23 compose Group4 14.

A network service identified by (S,G), for SSM address G and source host address S, is referred to as a "channel". Four Source Specific Multicast SSM test channels are created in the session-server 15, each channel aimed for one group. Source specific multicast delivery semantics are hereby provided for a datagram sent to an SSM address. That is, a datagram with source IP address S and SSM destination G is delivered to reflectors in the group that has specifically requested the reception of datagram sent to address G by source S, and only to this group i.e. to either one of the groups 1-4 11-12 in this example. A test session is a multicast data stream sent via a channel in a multicast group. Four test sessions 1-4 are shown with square formed symbols between entities in FIG. 2. In FIG. 2 is disclosed, with arrows directed downwards, how a first session 1 comprising three test packets 1$a$,1$b$,1$c$ is sent by Source Specific Multicast via routers 25 on a first channel from the session-server 15 to reflectors 16-17 in Group1 11. In a similar manner a second test session 2 is sent to Group2 12, session 3 to Group3 13 and session 4 to Group4 14. The test packets in each session will hereby according to Source Specific Multicasting architecture use the same path as would have been used in unicast.

The session-reflectors 16-23 in the groups 11-14 receive the test packets 1$a$-1$c$,2$a$-2$c$,3$a$-3$c$,4$a$-4$c$ sent in the sessions 1-4 from the session-server 15.

When receiving for example the packet 1$a$ by the reflectors 16 and 17 in group1 11, the packet is time-stamped regarding arriving time in the reflectors and thereafter buffered in the reflectors during a specified time period a so called window.

After lapse of the specified time period, the packet 1$a$ is again time stamped, now regarding sending time, and sent (reflected) back to the session-server. The replies are hereby timely performed within a time window. The size of the window can be calculated for example by randomized calculation from 0 to Max milliseconds or based on IP or MAC address as hold off time indicator. Important is that the reflections of packets from the different reflectors are spread out in time by using timely separated replies or similar techniques. To be noted is that other techniques can be used as long as the replies from different reflectors are spread out in time.

The reflected test packets 1$a$-1$c$,2$a$-2$c$,3$a$-3$c$,4$a$-4$c$ are forwarded to the server 15 via the routers 25. In FIG. 2 is disclosed with arrows directed upwards how sessions are sent via routers 25 from the reflectors to the session-server 15. The test packets in each session will according to Source Specific Multicasting architecture use the same path back as would have been used for normal traffic.

The reflected test packets 1$a$-1$c$,2$a$-2$c$,3$a$-3$c$,4$a$-4$c$ are received by the server 15, Due to the fact that packets are reflected within a time window that is different in time from other reflector's time window, the replies will be spread in time. When a group of reflectors are replying at the same time to the server it can create congestion. By spreading out the replies in time, congestion will be avoided.

When comparing used bandwidth in FIG. 1 (prior art) and used bandwidth in FIG. 2 it can easily be seen that also in this very simplified example disclosed in FIG. 2 considerable bandwidth savings will be reached. A more realistic scenario than the one disclosed in FIG. 2 would be to have instead of only eight reflectors, thousands of reflectors.

Figure 3:
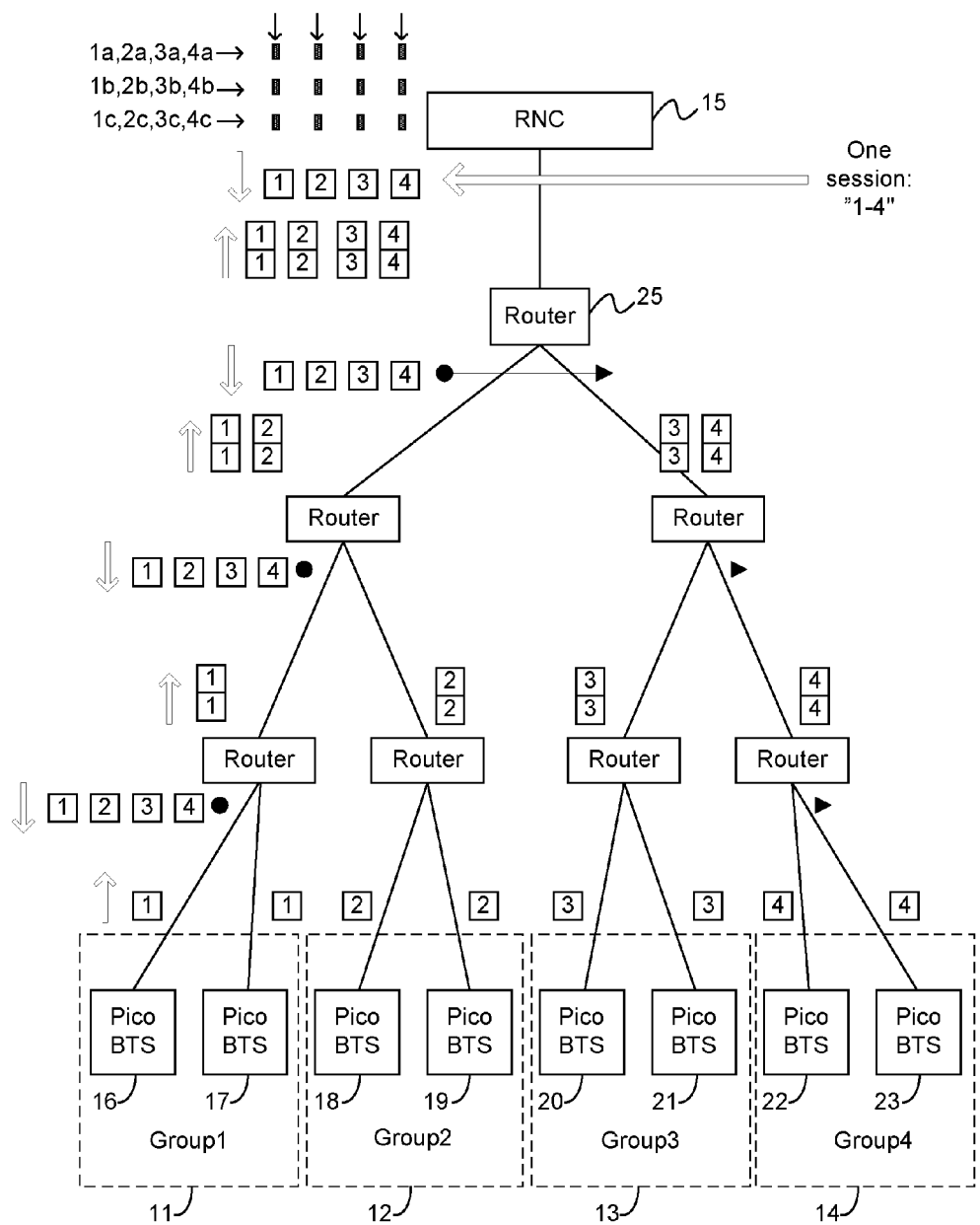
FIG. 3 discloses measurement of connectivity between a Radio Network controller RNC in this example (session-server) and base stations (session-reflectors). The measuring is performed with Two Way Active Measurement Protocol TWAMP by using Source Specific Multicast with one test sessions.

FIG. 3 discloses in a second exemplified embodiment measurement of connectivity between the session-server 15 and session-reflectors 16-23. Like in the first embodiment, a prerequisite for a method according to this second embodiment is that a service—a Two Way Active Measurement Protocol TWAMP service has been announced to potentially requesting receivers. Also in this example the service has been announced to all the session-reflectors 16-23 disclosed in FIG. 3 and all the session-reflectors have replied to the service by returning their respectively IP-address. Also in this embodiment the reflectors will be divided into groups and Source Specific Multicast will be used for the measuring. The method according to the second embodiment comprises the following steps:

At reception of the reflector IP-addresses, the reflectors 16-23 are divided in the session-server into defined groups 11-14. In FIG. 3 is disclosed how the reflectors 16-23 have been divided into four different groups 11-14.

One Source Specific Multicast SSM aggregated channel is created in the session-server 15, each channel out of four channels is identified inside the test message and aimed for one group. One test session "1-4" is sent via the four channels in FIG. 3. The session is disclosed with square formed symbols between entities in FIG. 3. It is disclosed in FIG. 3 with arrows directed downwards how the session "1-4" comprising test packets 1a-1c2a-2c,3a-3c,4a-4c is sent via routers 25 on the channels from the session-server 15 towards the reflectors 16-23. In this second embodiment each test packet 1a-1c,2a-2c,3a-3c,4a-4c has been tagged in the session-server 15 as belonging (being destined) to a defined group. In this example test packets 1a-1c have been tagged as being destined to group1 11, test packets 2a-2c have been tagged as being destined to group2 12 and so on. As disclosed by aid of the downwards arrows all the test packets 1a-1c,2a-2c,3a-3c,4a-4c will reach all the reflectors. However, as will be seen in the next method step, only packets tagged as belonging to a certain reflector will be reflected by said reflector.

The session-reflectors 16-23 in the groups 11-14 receive all the test packets 1a-1c,2a-2c,3a-3c,4a-4c sent from the session-server 15.

When receiving to reflectors in group2, for example the test packet 1a that has been tagged as belonging to group1 11 the packet will be neglected by reflectors in group2 12. When however receiving the test packet 2a by the reflectors 18 and 19 in group2 12, the packet is time-stamped regarding arriving time in the reflectors and thereafter buffered in the reflector during a specified time period.

After lapse of the specified time period, the packet 2a is again time stamped, now regarding sending time, and sent (reflected) back to the session-server. The replies are hereby timely performed within a time window like in the first embodiment.

The reflected test packets 1a-1c,2a-2c,3a-3c,4a-4c are forwarded to the server 15 via the routers 25. In FIG. 2 arrows directed upwards show how sessions are sent via routers 25 from the reflectors to the session-server 15. The test packets in each session will be sent back as unicast and use the same path back as would have been used in unicast.

The reflected test packets 1a-1c,2a-2c,3a-3c,4a-4c are received by the server 15, Due to the fact that packets are reflected within a time window that is different in time from other reflector's time window, the replies will be spread in time.

When comparing used bandwidth in FIG. 1 (prior art) and used bandwidth in FIG. 3 it can easily be seen like in the first embodiment that considerable bandwidth savings have been reached.

Figure 4:
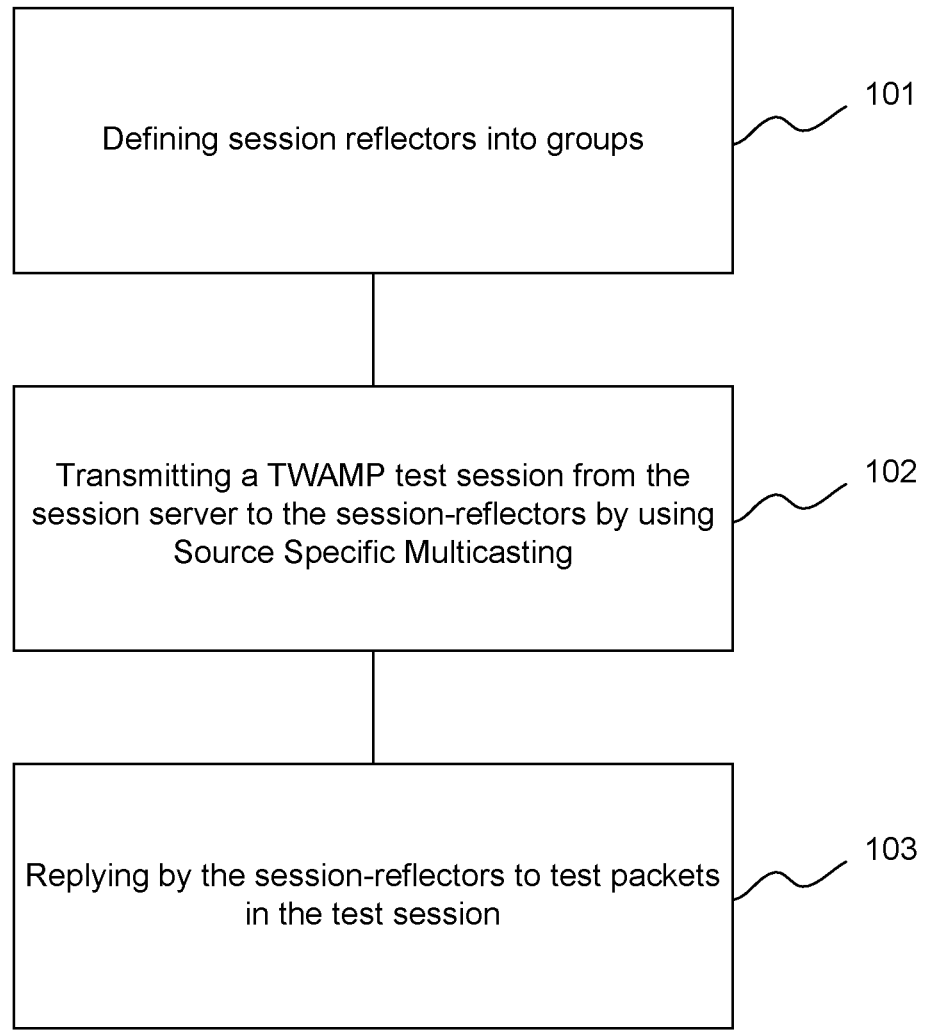
FIG. 4 discloses in a flow chart the set-up and measuring of connectivity between TWAMP entities using Source Specific Multicasting.

FIG. 4 discloses a flowchart in which some of the more important steps are shown. The flowchart is to be read together with the earlier shown figures. The flowchart comprises the following steps:

The reflectors 16-23 are divided in the session-server into defined groups 11-14. This step is disclosed in FIG. 4 by a block 101.

A Session comprising test packets is sent by Source Specific Multicast via routers 25 from the session-server 15 to reflectors in a destined Group. This step is disclosed in FIG. 4 by a block 102.

Test packets are reflected by the reflectors. The reflected test packets are hereby forwarded to the server 15 via the routers 25. This step is disclosed in FIG. 4 by a block 103.

Figure 5:
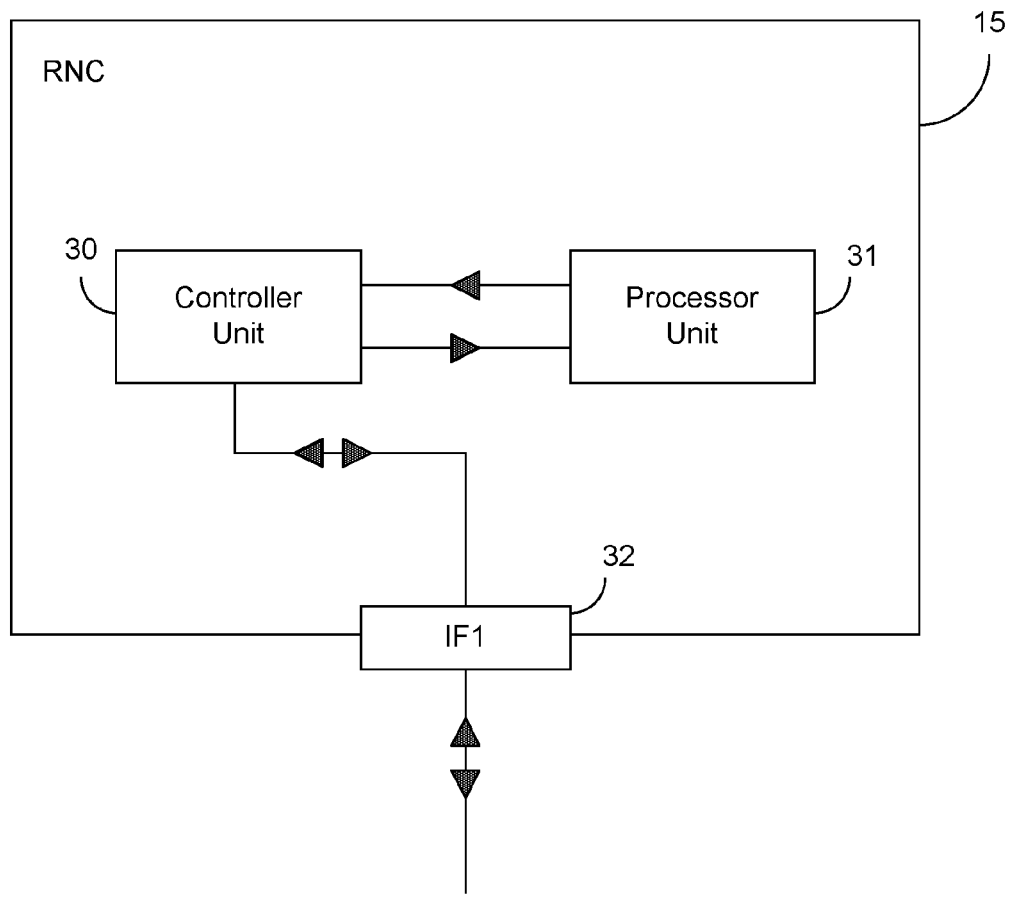
FIG. 5 discloses a block schematic illustration of a session-server node.

FIG. 5 discloses in an exemplified embodiment a block schematic illustration of a session-server node 15. Examples of session-server nodes are a Radio Network Controller RNC, Gateway GPRS Support Node GGSN or a SGW/PDN gateway. The session-server comprises a Controller Unit 30, a Processor Unit 31 and a first Interface IF1 32. The processor Unit is responsible for receiving replies from session reflectors via the first Interface 32, i.e. after the reflectors have initiated join request to a service by returning their respectively IP-address to a router. The controller Unit 30 is responsible for establishing a test session with the reflectors. After the session is established, the controller transmits test packets via the first Interface to the reflectors by using Source Specific Multicast. The Controller Unit 30 further is responsible for receiving reflected packets via the first Interface 32 and to forward the packets to the Processor Unit for evaluation.

Figure 6:
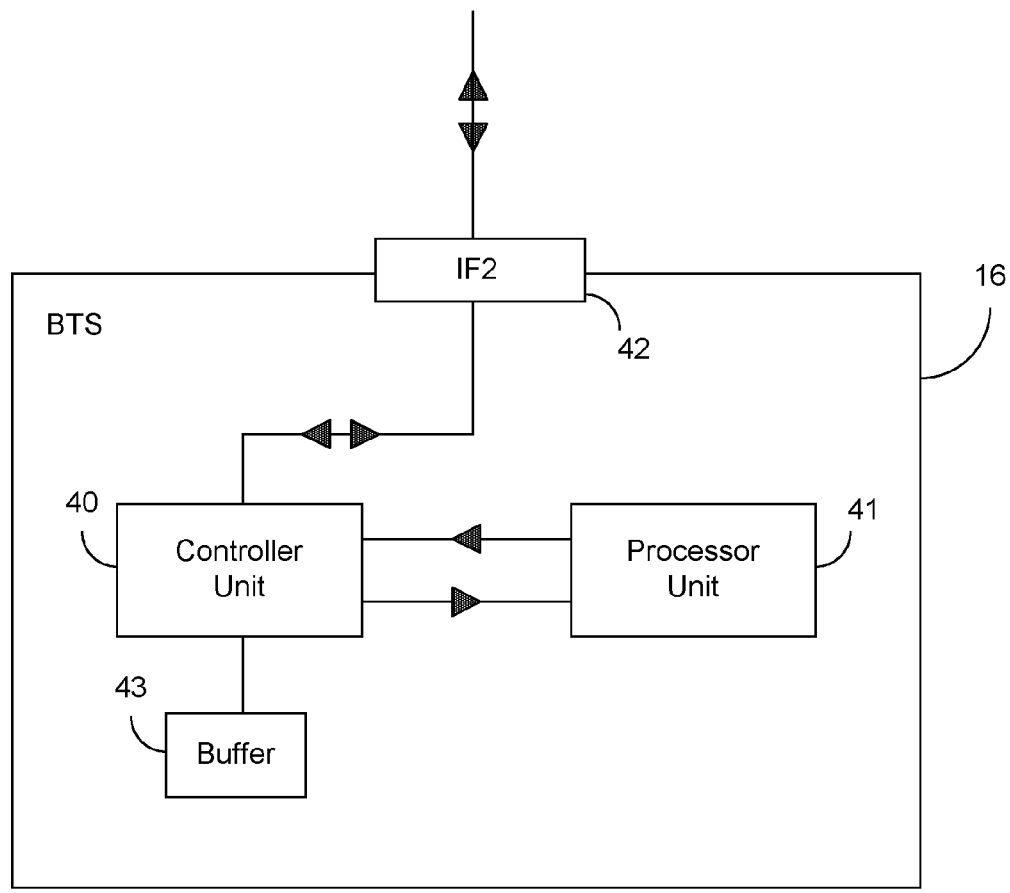
FIG. 6 discloses a block schematic illustration of a session-reflector node.

FIG. 6 discloses in an exemplified embodiment a block schematic illustration of a session-receiver node 16. Examples of session-reflector nodes are a Base Station BTS, eNodeB or a Pico Base Station. The session-receiver comprises a Controller Unit 40, a Processor Unit 41, a second Interface IF2 42 and a Buffer 43. The Controller Unit is responsible for receiving test packets via the second Interface and forward to the Processor Unit 41. The processor Unit is responsible for evaluating received test packets, time stamp the packets and buffer the packets in the Buffer 43, and specify a time to buffer the test packet. The controller Unit 40 is further responsible for reflecting test packet to the session-server node 15 after lapse of the specified time.

System and nodes that can be used to put the invention into practice is schematically shown in the figures. Enumerated items are shown in the figures as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI), Long Term Evolution (LTE) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer. The invention is not limited to the above described and in the drawings shown embodiments but can be modified within the scope of the enclosed claims.

The invention claimed is:

1. A method to measure connectivity between Two Way Active Measurement Protocol (TWAMP) entities comprising a session-server and session-reflectors in a communication network, the method comprising:
   dividing, in the session-server, the session-reflectors into a plurality of defined groups of one or more session-reflectors;
   transmitting a test session from the session-server to the one or more session-reflectors of each of the plurality of defined groups by using Source Specific Multicasting (SSM), the test session comprising a plurality of test packets, wherein each test packet is tagged by the session-server as being destined to a corresponding one of the plurality of defined groups;
   receiving, by the one or more session reflectors of at least one group of the plurality of defined groups, each of the plurality of test packets; and
   replying, by the one or more session-reflectors of the at least one group, to the test packets tagged to be destined to the at least one group.

2. The method of claim 1, wherein the replying to the at least one test packet is timely performed within a time window.

3. The method of claim 1, wherein received packets are time stamped by the session-reflectors before being sent back to the session-server.

4. The method of claim 1, wherein the session-reflectors are divided into the plurality of defined groups by using hashing techniques.

5. The method of claim 1, wherein the session-reflectors are divided into the plurality of defined groups by using pre-configuration techniques.

6. The method of claim 1, wherein the replying comprises the one or more session-reflectors sending the packet back after buffering a specified time.

7. The method of claim 6, wherein a sliding time window technique is used to send the packet back to the session-server.

8. The method of claim 1, wherein the session-reflectors are non-dedicated units.

9. A session-server node of a communication network configured to transmit a Two Way Active Measurement Protocol (TWAMP) test session to session-reflectors, the session-server node comprising:
   one or more processing circuits configured to:
      divide the session-reflectors into a plurality of defined groups of one or more session-reflectors;
      transmit a test session comprising a plurality of test packets to the one or more session-reflectors of each of the plurality of defined groups by using Source Specific Multicasting (SSM);
      tag each of the plurality of test packets in the test session as being destined to a corresponding one of the plurality of defined groups; and
      receive test packets from the one or more session-reflectors of at least one group of the plurality of defined groups, wherein the received test packets are tagged to be destined to the at least one group.

10. The session-server node of claim 9, wherein the one or more processing circuits are further configured to define the plurality of groups of the one or more session-reflectors by using hashing techniques.

11. The session-server node of claim 9, wherein the one or more processing circuits are further configured to define the plurality of groups of the one or more session-reflectors by using pre-configuring techniques.

12. A computer program product stored in a non-transitory computer readable medium for measuring connectivity between Two Way Active Measurement Protocol (TWAMP) entities comprising a session-server and session-reflectors in a communication network, the computer program product comprising software instructions which, when run on one or more processors of the communication network, causes the communication network to:
   divide, by the session-server, the session-reflectors into a plurality of defined groups of one or more session-reflectors;
   transmit a test session from the session-server to the one or more session-reflectors of each of the plurality of defined groups by using Source Specific Multicasting (SSM), the test session comprising a plurality of test packets, wherein each test packet is tagged by the session-server as being destined to a corresponding one of the plurality of defined groups;
   receiving, by the one or more session reflectors of at least one group of the plurality of defined groups, each of the plurality of test packets; and
   replying, by the one or more session-reflectors of the at least one group, to the test packets tagged to be destined to the at least one group.

* * * * *